United States Patent [19]

Andrews

[11] Patent Number: 4,507,445

[45] Date of Patent: * Mar. 26, 1985

[54] HEAT-CURABLE EPOXIDE RESIN COMPOSITIONS

[75] Inventor: Christopher M. Andrews, Cambridge, England

[73] Assignee: Ciba-Geigy Corporation, Ardsley, N.Y.

[*] Notice: The portion of the term of this patent subsequent to Sep. 13, 2000 has been disclaimed.

[21] Appl. No.: 538,023

[22] Filed: Sep. 30, 1983

[30] Foreign Application Priority Data

Oct. 12, 1982 [GB] United Kingdom ............... 8229073
Oct. 12, 1982 [GB] United Kingdom ............... 8229074

[51] Int. Cl.³ .................... C08G 59/62; C08G 59/44
[52] U.S. Cl. .................................. 525/504; 528/93; 528/94; 528/99; 528/361; 528/365; 528/368; 528/407
[58] Field of Search ............... 525/504; 528/99, 93, 528/94, 361, 365, 368, 407

[56] References Cited

U.S. PATENT DOCUMENTS 3,386,956 6/1968 Nawakowski et al. .
3,488,376 1/1970 Ulrich .
3,660,316 5/1972 Schaefer et al. .
3,759,914 9/1973 Simms et al. .
3,956,237 5/1976 Doorakian et al. .
4,283,520 8/1981 Moser et al. .
4,404,356 9/1983 Andrews ....................... 528/99

FOREIGN PATENT DOCUMENTS 999862 7/1965 United Kingdom .
1293142 10/1972 United Kingdom .

OTHER PUBLICATIONS

H. Ulrich et al., Synthesis, 4, 277 (1979).
Derwent CPI Abstract No. 50727c/29.

*Primary Examiner*—Earl A. Nielsen
*Attorney, Agent, or Firm*—Luther A. R. Hall

[57] ABSTRACT

Epoxide resins are cured by heating with a hydroxyphenylurea of formula

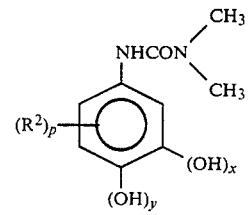

where
R² denotes —NH₂, —NO₂, —Cl, —Br, or alkyl, p denotes zero, x and y each denote zero or 1, and the sum of x+y is 1. Such hydroxyphenylureas may be used alone, as accelerators for heat-curing with other agents such as dicyandiamide, melamine, and carboxylic acid hydrazides, or may be used as the primary curing agent with promoters such as dicyandiamide, melamine, and carboxylic hydrazides.

20 Claims, No Drawings

HEAT-CURABLE EPOXIDE RESIN COMPOSITIONS

This invention relates to heat-curable epoxide resin compositions, to a process for their cure, and to cured products obtained by this process.

It is known that epoxide resins, i.e., substances containing on average more than one 1,2-epoxide group per molecule, may be cured by reaction with various classes of substances to form cross-linked, infusible, insoluble products having valuable technical properties.

U.S. Pat. No. 3,386,956 discloses the curing of epoxide resins by means of ureas represented by the following formulae

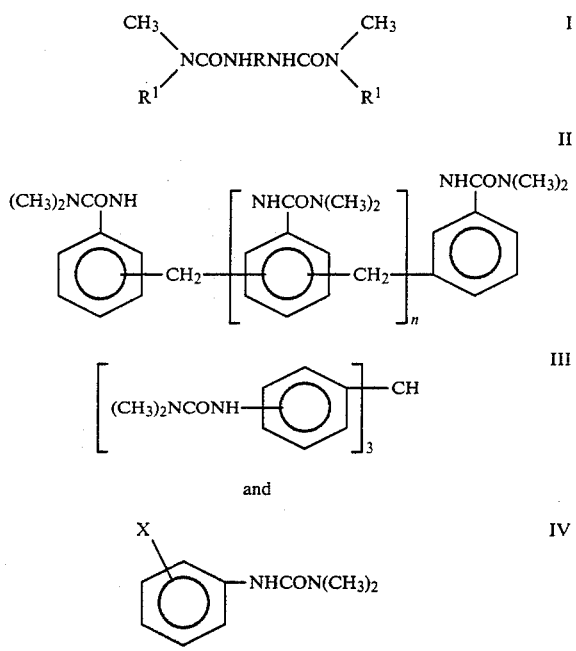

where
R represents a divalent radical selected from the group consisting of methyl-substituted phenylene, methylenediphenylene, dimethoxydiphenylene, and dimethyldiphenylene,
$R^1$ represents —$CH_3$ or —$CH_2CH_2OH$,
n is an integer of from 2 to 5, and
X represents —$OCH_3$, —Cl, —H, —$CH_3$, or —$NO_2$.

The United States Patent also discloses that the curing effect of these agents may be promoted by incorporating dicyandiamide, stearic hydrazide, adipic dihydrazide, succinimide, or cyanoacetamide in the curable compositions.

According to that patent, use of the aforesaid ureas overcomes a difficulty associated with curable epoxide resin compositions of the prior art, namely, that relatively high temperatures and relatively long curing times were needed if curing agents such as dicyandiamide were used, whereas if other, more reactive, curing agents or accelerators were used they caused premature curing at room temperature, i.e., they were not sufficiently latent.

U.S. Pat. No. 3,660,316 discloses that 1-cyano-3-(lower alkyl)guanidines also promote the curing of epoxide resins by bisureas of formula II to IV.

Ureas of the foregoing formulae, in particular N-(4-chlorophenyl)-N',N'-dimethylurea and 2,4-bis(N,N-dimethylureido)toluene, have been used commercially to cure epoxide resins, alone or with dicyandiamide as promoter, and also as promoters of the curing of epoxide resins with dicyandiamide.

However, because of increasingly severe requirements for curable compositions having long storage lives at room temperature but curing rapidly at moderately elevated temperatures (e.g., 100° C.), replacements for the above-mentioned ureas are now being sought.

We have now found that certain phenolic ureas substantially meet these more stringent requirements.

This invention accordingly provides heat-curable compositions comprising
(a) an epoxide resin and
(b) an effective amount of a urea of formula

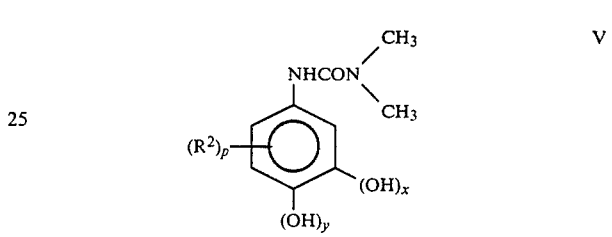

where
$R^2$ denotes —$NH_2$, —$NO_2$, —Cl, —Br, or alkyl of 1 to 10 carbon atoms,
p denotes zero, 1, or 2,
x and y each denote zero or 1, and
the sum of x+y is 1.

There are further provided a process for curing epoxide resins comprising heating the heat-curable compositions of this invention and cured epoxide resins obtained by this process.

Preferably p denotes zero, or 1 with $R^2$ denoting —$NO_2$, —Cl, or —$CH_3$, or 2 with each $R^2$ denoting —Cl.

Especially preferred compounds of formula V are N-(3-hydroxyphenyl)-N',N'-dimethylurea, N-(4,6-dichloro-3-hydroxyphenyl)-N',N'-dimethylurea, N-(4-hydroxyphenyl)-N',N'-dimethylurea, N-(4-hydroxy-2-methylphenyl)-N',N'-dimethylurea, N-(4-hydroxy-3-nitrophenyl)-N',N'-dimethylurea and N-(3,5-dichloro-4-hydroxyphenyl)-N',N'-dimethylurea.

The compositions may contain a heat-curing amount of (b), i.e., a urea of formula V is the sole curing agent. In such cases there will usually be employed from 3 to 25, preferably 5 to 20, parts by weight of (b) per 100 parts by weight of the epoxide resin (a).

Hydroxyphenylureas of formula V are, in general, known or may be made by known methods. A convenient method of preparation is described in British Patent Specification No. 999 862, in which m- or p-hydroxyphenylureas of formula V are made as intermediates for their propargyl ethers to be used as herbicides. An aminophenol of formula

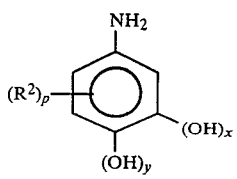

is treated with a dimethylcarbamoyl halide of formula

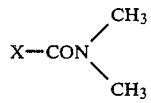

where
R², p, x and y are as hereinbefore defined and
X represents a halogen, preferably a chlorine, atom.
This reaction is usually effected in an organic solvent at ambient or elevated temperature, in the presence or absence of an organic or inorganic base.

Another convenient method comprises reaction of an aminophenol of formula VI with phosgene in an aprotic highly polar solvent to yield the isocyanotophenol followed by treatment with dimethylamine to give the desired ureidophenol (see U.S. Pat. No. 3,488,376, where these products are described as intermediates for ureidophenyl carbamates to be used as herbicides, and H. Ulrich et al., Synthesis, 1979 No. 4, 277-279).

Hydroxyphenylureas of formula V in which p is 1 or 2 may be made from other compounds of formula V by known methods. For example, a compound of formula V in which p represents zero may be nitrated or halogenated to give a compound in which p is 1 or 2 and R² denotes a nitro group or a halogen atom. Compounds of formula V in which R² denotes a nitro group may be reduced to give the corresponding amino compounds.

We have further found that dicyandiamide, melamine. carboxylic acid hydrazides, and certain other compounds promote the heat-curing of epoxide resins with ureas of formula V.

There are thus also provided heat-curable compositions according to this invention which contain in addition
(c) a minor amount by weight, calculated on the weight of (b), of an accelerator for the heat-curing, selected from dicyandiamide, carboxylic acid hydrazides, succinimide, cyanoacetamide, 1-cyano-3-(lower alkyl)guanidines wherein the lower alkyl group or groups contain up to 3 carbon atoms, imidazoles, and salts of carboxylic acids with tertiary amines, (b) with (c) together constituting a heat-curing amount for (a); typically they together comprise 5 to 25 parts by weight per 100 parts by weight of the epoxide resin (a).

We have also found that ureas of formula V accelerate the heat-curing of epoxide resins with dicyandiamide, melamine, carboxylic acid hydrazides, and certain other compounds.

There are thus further provided heat-curable compositions according to this invention which contain in addition
(d) a major amount, calculated on the weight of (b), of a heat-curing agent for epoxide resins selected from dicyandiamide, melamine, carboxylic acid hydrazides, succinimide, cyanoacetamide, 1-cyano-3-(lower alkyl)guanidines wherein the lower alkyl group or groups contain up to 3 carbon atoms, imidazoles, and salts of carboxylic acids with tertiary amines, (d) with (b) together constituting a heat-curing amount for (a), typically together comprising 5 to 25 parts by weight per 100 parts by weight of the epoxide resin (a).

Epoxide resins which may be employed in these compositions are preferably those containing at least two groups of formula

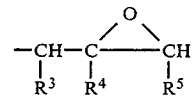

directly attached to an atom or atoms of oxygen, nitrogen, or sulphur, where either R³ and R⁵ each represent a hydrogen atom, in which case R⁴ denotes a hydrogen atom or a methyl group, or R³ and R⁵ together represent —CH₂CH₂—, in which case R⁴ denotes a hydrogen atom.

As examples of such resins may be mentioned polyglycidyl and poly(β-methylglycidyl)esters obtainable by reaction of a compound containing two or more carboxylic acid groups per molecule with epichlorohydrin, glycerol dichlorohydrin, or β-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(β-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)-glycols, propane-1,2-diol and poly(oxypropylene)-glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrakis(4-hydroxyphenyl)ethane, 2,2-bis(4-hydroxyphenyl)propane, 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, m-xylylenediamine, and bis(4-methylaminophenyl)methane; triglycidyl isocyanurate; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl)ether.

Examples of epoxide resins having groups of formula VIII where $R^3$ and $R^5$ conjointly denote a —$CH_2CH_2$— group are bis(2,3-epoxycyclopentyl)ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

If desired, a mixture of epoxide resins may be used.

Preferred epoxide resins are polyglycidyl ethers, polyglycidyl esters, N,N'-diglycidylhydantoins, and poly(N-glycidyl) derivatives of aromatic amines. Specific preferred resins are polyglycidyl ethers of 2,2-bis(4-hydroxyphenyl)propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, bis(4-(diglycidylamino)phenyl)methane, and p-(diglycidylamino)phenyl glycidyl ether.

When the accelerator (c) or the major curing agent (d) is a carboxylic acid hydrazide it is preferably stearic acid hydrazide, oxalic acid dihydrazide, adipic acid dihydrazide, sebacic acid dihydrazide, or isophthalic acid dihydrazide.

When the accelerator (c) or the major curing agent (d) is a 1-cyano-3-(lower alkyl)guanidine it is preferably the 3-methyl, 3,3-dimethyl, or 3,3-diethyl compound.

When the accelerator (c) or the major curing agent (d) is an imidazole it is preferably 2-phenylimidazole, N-methylimidazole, or 2-ethyl-4-methylimidazole.

When the accelerator (c) or the major curing agent (d) is a salt of a carboxylic acid with a tertiary amine it is preferably a salt of a hydroxycarboxylic acid, such as lactic acid or salicylic acid, with a Mannich base such as 2,4,6-tris(dimethylaminomethyl)phenol.

Normally the accelerator (c) will be present in a proportion of 10 to 50 parts by weight per 100 parts by weight of the urea (b), and the urea (b), when used as accelerator for the hardening agent (d), will be present in a proportion of 25 to 75 parts by weight per 100 parts by weight of (d).

The new compositions may further contain suitable plasticisers such as dibutyl phthalate and dioctyl phthalate, inert diluents such as tars and bitumen and so-called reactive diluents, especially monoepoxides such as n-butyl glycidyl ether, iso-octyl glycidyl ether, phenyl glycidyl ether, cresyl glycidyl ethers, glycidyl esters of mixed tertiary, aliphatic, monocarboxylic acids, glycidyl acrylate, and glycidyl methacrylate. They may also contain additives such as fillers, reinforcing materials, polymeric toughening agents such as polyether sulphones, phenoxy resins, and butadiene-acrylonitrile rubbers, colouring matter, flow control agents, flame inhibitors, and mould lubricants. Suitable extenders, fillers and reinforcing materials are, for example, glass fibres, carbon fibres, fibres of aromatic polyamides, ballotini, mica, quartz flour, calcium carbonate, cellulose, kaolin, wollastonite, colloidal silica having a large specific surface area, powdered poly(vinyl chloride), and powdered polyolefin hydrocarbons such as polyethylene and polypropylene.

The curable compositions of this invention may be used as laminating resins, impregnating and casting resins, powder coatings, moulding compositions, putties and sealing compounds, potting and insulating compounds for the electrical industry, but especially adhesives and as primers for adhesives.

The compositions of this invention are preferably cured by heating them at a temperature in the range 100° C. to 180° C., especially 100° to 130° C. Usually, heating for 30 to 120 minutes suffices to achieve curing.

The following Examples illustrate the invention. Parts are by weight.

Ureas used in these Examples are prepared as follows:

N-(3-Hydroxyphenyl)-N',N'-dimethylurea m-Aminophenol (10 g) and N,N-dimethylcarbamoyl chloride (7.42 g) are dissolved in tetrahydrofuran (65 ml) and the solution is stirred at 30° C. for 4 hours. The solvent is evaporated under reduced pressure and the solid residue is suspended in water. The mixture is filtered, washed well with water, and dried in a desiccator to give N-(3-hydroxyphenyl)-N',N'-dimethylurea which melts at 198° C. (decomp.) as measured on a Kofler bench. (U.S. Pat. No. 3,488,376 reports m.pt. 194°–197° C.).

N-(4,6-Dichloro-3-hydroxyphenyl)-N',N'-dimethylurea

N-(3-Hydroxyphenyl)-N',N'-dimethylurea (4.5 g) is dissolved in glacial acetic acid (100 ml) at 55° C. and the solution is then cooled to 30° C. Gaseous chlorine (1.77 g) is bubbled into the solution and, on complete addition of chlorine, the mixture is stirred for a further hour at 30° C., then concentrated in vacuo at 80° C. until a solid begins to form. The mixture is cooled to 10° C. and filtered, the residue being washed thoroughly with water. This residue is recrystallised from isopropanol to give N-(4,6-dichloro-3-hydroxyphenyl)-N',N'-dimethylurea (1.55 g) m.pt. 208° C. (decomp.).

N-(4-Hydroxyphenyl)-N',N'-dimethylurea

This is made as described in British Patent Specification No. 999 862. Thus, p-aminophenol (30 g), dimethylcarbamoyl chloride (30 g), sodium hydrogen carbonate (28 g), and dry acetone (600 ml) are stirred and heated under reflux for 3 hours. The mixture is filtered hot and the filtrate is allowed to cool overnight. The crystals which form are filtered off to give the desired urea, m.pt. 205° C. (decomp.). as measured on a Kofler bench (British Patent Specification No. 999 862 reports m.pt. 205°–206° C.).

N-(4-Hydroxy-2-methylphenyl)-N',N'-dimethylurea

This material is prepared as described above but replacing the p-aminophenol by an equimolar amount of 4-amino-3-methylphenol. It melts at 245° C. (decomp.).

N-(3,5-Dichloro-4-hydroxyphenyl)-N',N'-dimethylurea

This material is prepared as described above but replacing the p-aminophenol by an equimolar amount of 4-amino-2,6-dichlorophenol. It melts at 196° C. (decomp.).

N-(4-Hydroxy-3-nitrophenyl)-N',N'-dimethylurea

4-Hydroxy-3-nitrophenylisocyanate (15.5 g), prepared as described by H. Ulrich et al., loc. cit., from 4-amino-2-nitrophenol and phosgene, is added to 100 g of a solution of 29% by weight of dimethylamine in toluene, and the mixture is stirred at room temperature for 2 hours. Evaporation under reduced pressure leaves a residue on recrystallization from water gives N-(4-hydroxy-3-nitrophenyl)-N',N'-dimethylurea, m.pt. 142° C.

'Epoxide Resin I' denotes a polyglycidyl ether of 2,2-bis(4-hydroxyphenyl)propane having a 1,2-epoxide content of 5.16 equivalents per kilogram and a viscosity at 21° C. of 24.5 Pa s.

Epoxide Resin II denotes the tetrakis(N-glycidyl) derivative of bis(4-aminophenyl)methane, having an epoxide content of 7.8–8.2 equivalents per kilogram.

Gel times are determined by placing approximately 0.1 g of the mixture onto a metal block heated to the indicated temperature, and observing the time taken for gelation to occur.

EXAMPLE 1

A mixture of 100 parts of Epoxide Resin I, 13 parts of N-(3-hydroxyphenyl)-N',N'-dimethylurea, and 5 parts of a commercially-available thixotropic agent comprising asbestos is prepared on a triple roll mixer. The gelation time is 22½ minutes at 120° C. and 30 days at 40° C.

EXAMPLE 2

The process of Example 1 is repeated, replacing the urea by 15.5 parts of N-(4,6-dichloro-3-hydroxyphenyl)-N',N'-dimethylurea. The gelation time is 30½ minutes at 120° C. and over 30 days at 40° C.

EXAMPLE 3

This Example illustrates the use of dicyandiamide to promote the heat-curing of epoxy resins with a urea of formula V.

A mixture of 100 parts of Epoxide Resin I. 10 parts of N-(3-hydroxyphenyl)-N',N'-dimethylurea, 2 parts of dicyandiamide, and 5 parts of a commercially-available thixotropic agent comprising asbestos has a gelation time at 120° C. of 18¾ minutes. This result may be compared with that obtained in Example 1, where a larger amount (13 parts) of the urea is used.

EXAMPLE 4

This Example illustrates the use of a urea of formula V to accelerate the heat-curing of epoxide resins with dicyandiamide.

The following compositions are prepared, the figures indicating parts by weight:

|  | a | b |
|---|---|---|
| Epoxide Resin I | 100 | 100 |
| Dicyandiamide | 7 | 7 |
| Thixotropic agent | 6 | 6 |
| N—(3-Hydroxyphenyl)-N',N'—dimethylurea | 4 | 0 |

(The thixotropic agent consists of 5 parts of finely divided silica and one part of glycerol.)

Samples of the compositions are heated at 120° C.: "a" gels in 24 minutes but "b" has not gelled when the experiment is terminated after heating for 150 minutes.

EXAMPLE 5

A mixture of 100 parts of Epoxide Resin I, 13 parts of N-(4-hydroxyphenyl)-N',N'-dimethylurea, and 5 parts of a commercially-available thixotropic agent comprising asbestos is prepared on a triple roll mixer. The gelation time of this mixture is 27 minutes at 120° C. and 28 days at 40° C.

EXAMPLE 6

Example 5 is repeated, replacing the urea by N-(4-hydroxy-2-methylphenyl)-N',N'-dimethylurea (14 parts). The gelation time is 25 minutes at 120° C. and 24 days at 40° C.

EXAMPLE 7

Example 5 is repeated, replacing the urea by N-(3,5-dichloro-4-hydroxyphenyl)-N',N'-dimethylurea (18 parts). The gelation time is 32½ minutes at 120° C. and 30 days at 40° C.

EXAMPLE 8

This Example illustrates the use of dicyandiamide to promote the heat-curing of epoxy resins with a urea of formula V.

The procedure of Example 5 is repeated except that the mixture also contains 2 parts of dicyandiamide. The gel time at 120° C. is reduced from 27 to 16 minutes.

EXAMPLE 9

This Example illustrates the use of a urea of formula V to accelerate the heat-curing of epoxide resins with dicyandiamide.

The following compositions are prepared, the figures indicating parts by weight:

|  | a | b |
|---|---|---|
| Epoxide Resin I | 100 | 100 |
| Dicyandiamide | 7 | 7 |
| Thixotropic agent | 6 | 6 |
| N—(4-Hydroxyphenyl)-N',N'—dimethylurea | 4 | 0 |

(The thixotropic agent consists of 5 parts of finely-divided silica and one part of glycerol.)

Samples of the compositions are heated at 120° C.: "a" gels in 21 minutes but "b" has not gelled when the experiment is terminated after heating for 150 minutes.

EXAMPLE 10

Example 5 is repeated, replacing the urea by N-(4-hydroxy-3-nitrophenyl)-N',N'-dimethylurea (16.2 parts). The gelation time is 33 minutes at 120° C. and more than 18 days at 40° C.

EXAMPLE 11

Mixtures of Epoxide Resin II and N-(4-hydroxyphenyl)-N',N'-dimethylurea are prepared containing (i) 2½ parts, (ii) 5 parts and (iii) 10 parts of the urea per 100 parts of the resin. The gelation times of the mixtures at different temperatures are as follows:

| Temperature | Gelation Time | | |
|---|---|---|---|
| | (i) | (ii) | (iii) |
| 150° C. | 6½ mins. | 3½ mins. | 2½ mins. |
| 130° C. | 14 mins. | 9 mins. | 7½ mins. |
| 110° C. | 46 mins. | 27 mins. | 22 mins. |
| 100° C. | 70 mins. | 55 mins. | 45 mins. |
| 90° C. | 180 mins. | 96 mins. | 88 mins. |
| 40° C. | >18 days | 15 days | 10 days |

EXAMPLE 12

In this Example, compositions are heat-cured when forming adhesive joints.

Mixtures of 100 parts of Epoxide Resin I, 25 parts of aluminium powder (passing 200 mesh, British Standard 410), 5 parts of a commercially-available thixotropic agent comprising asbestos, and 13 parts of either N-(3-hydroxyphenyl)-N',N'-dimethylurea, or N-(4-hydroxyphenyl)-N',N'-dimethyl urea, are prepared on a triple roll mill and used to prepare single lap joints 2.54 cm×1.27 cm, using degreased and pickled aluminium alloy sheets, available under the designation "2L 73 Alclad" (Alclad is a registered Trade Mark). The mixtures are cured by being heated for 1 hour at 120° C. The shear strength of the bond is 28.4 MPa for the composition containing the 3-hydroxy isomer, and 29.2 MPa for the composition containing the 4-hydroxy isomer.

EXAMPLE 13

This Example shows the acceleration by a hydrazide of the curing of an epoxide resin by means of a urea of formula V.

The following compositions are prepared by triple roll milling, the figures denoting parts. It will be seen that incorporation of adipic hydrazide brings about a reduction in gelation time without affecting storage life.

| | a | b |
|---|---|---|
| Epoxide Resin I | 100 | 100 |
| N—(4-hydroxyphenyl)-N',N'—dimethyl urea | 10 | 10 |
| Thixotropic agent* | 2 | 2 |
| Adipic hydrazide | 4 | 0 |
| Gel time at | | |
| 120° C. | 13 minutes | 21.5 minutes |
| 100° C. | 70 minutes | 80 minutes |
| Storage life at | | |
| 40° C. | >18 days | >18 days |

*commercially-available, asbestos-based product

EXAMPLE 14

This Example illustrates the acceleration by a urea of formula V of the curing of an epoxide resin by means of adipic hydrazide.

The following compositions are prepared by triple roll milling, the figures denoting parts:

| | a | b |
|---|---|---|
| Epoxide Resin I | 100 | 100 |
| Adipic hydrazide | 22.5 | 22.5 |
| Thixtropic agent* | 2 | 2 |
| N—(4-hydroxyphenyl)-N',N'—dimethyl urea | 5.6 | 0 |
| Gel time at | | |
| 120° C. | 11 minutes | 180 minutes |
| 100° C. | 65 minutes | >390 minutes |
| Storage life at 40° C. | >18 days | >18 days |

*a commercially-available material based on asbestos

EXAMPLE 15

In this Example the glass transition temperature of a cured epoxide resin composition containing a urea of formula V is obtained by differential scanning calorimetry.

Compositions are prepared containing 100 parts of Epoxide Resin I, 5 parts of asbestos-based thixotropic agent, and 13 parts of either N-(4-hydroxyphenyl)-N',N'-dimethyl urea, or N-(3-hydroxyphenyl)-N',N'-dimethyl urea. Samples of both compositions are cured for 1 hour at 120° C., and both show a glass transition temperature of 105° C.

What is claimed is:

1. A heat-curable composition comprising
   (a) an epoxide resin and
   (b) an effective amount of a urea of formula

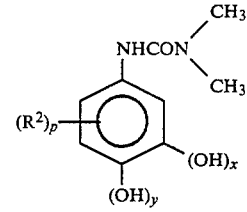

where
R$^2$ denotes —NH$_2$, —NO$_2$, —Cl, —Br, or alkyl of 1 to 10 carbon atoms,
p denotes zero, 1, or 2,
x and y each denote zero or 1, and
the sum of x+y is 1.

2. A composition according to claim 1, in which p is zero, or 1 with R$^2$ denoting —NO$_2$, —Cl, or —CH$_3$, or in which p is 2 with each R$^2$ denoting —Cl.

3. A composition according to claim 1, in which (b) is N-(3-hydroxyphenyl)-N',N'-dimethylurea, N-(4,6-dichloro-3-hydroxyphenyl)-N',N'-dimethylurea, N-(4-hydroxyphenyl)-N',N'-dimethylurea, N-(4-hydroxy-2-methylphenyl)-N',N'-dimethylurea, N-(4-hydroxy-3-nitrophenyl)-N',N'-dimethylurea or N-(3,5-dichloro-4-hydroxyphenyl)-N',N'-dimethylurea.

4. A composition according to claim 1, containing a heat-curing amount of (b).

5. A composition according to claim 4, containing from 3 to 25 parts by weight of (b) per 100 parts by weight of (a).

6. A composition according to claim 1, which further contains
   (c) a minor amount by weight, calculated on the weight of (b), of an accelerator for the heat-curing, selected from the group consisting of dicyandiamide, carboxylic acid hydrazides, succinimide, cyanoacetamide, 1-cyano-3-(lower alkyl)guanidines wherein the lower alkyl group or groups contain up to 3 carbon atoms, imidazoles, and salts of carboxylic acids with tertiary amines.

7. A composition according to claim 6, containing from 10 to 50 parts by weight of (c) per 100 parts by weight of (b).

8. A composition according to claim 6, in which the carboxylic acid hydrazide is stearic hydrazide, oxalic acid dihydrazide, adipic acid dihydrazide, or isophthalic acid dihydrazide.

9. A composition according to claim 6, in which the imidazole is 2-phenylimidazole, N-methylimidazole, or 2-ethyl-4-methylimidazole.

10. A composition according to claim 1, which further contains
(d) a major amount by weight, calculated on the weight of (b), of a heat-curing agent selected from the group consisting of dicyandiamide, carboxylic acid hydrazides, succinimide, cyanoacetamide, 1-cyano-3-(lower alkyl)guanidines wherein the lower alkyl group or groups contain up to 3 carbon atoms, imidazoles, and salts of carboxylic acids with tertiary amines.

11. A composition according to claim 10, containing from 25 to 75 parts by weight of (b) per 100 parts by weight of (d).

12. A composition according to claim 10, in which the carboxylic acid hydrazide is stearic hydrazide, oxalic acid dihydrazide, adipic acid dihydrazide or isophthalic acid dihydrazide.

13. A composition according to claim 10, in which the imidazole is 2-phenylimidazole, N-methylimidazole, or 2-ethyl-4-methylimidazole.

14. A composition according to claim 1, in which (a) contains at least two groups of formula

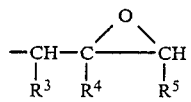

VIII directly attached to an atom or atoms of oxygen, nitrogen or sulphur, where either $R^3$ and $R^5$ each represent a hydrogen atom, in which case $R^4$ represents a hydrogen atom or a methyl group, or $R^3$ and $R^5$ together represent —$CH_2CH_2$—, in which case $R^4$ denotes a hydrogen atom.

15. A composition according to claim 14, in which (a) is a polyglycidyl ether, a polyglycidyl ester, an N,N'-diglycidylhydantoin, or a poly(N-glycidyl) derivative of an aromatic amine.

16. A composition according to claim 15, in which (a) is a polyglycidyl ether of 2,2-bis(4-hydroxyphenyl)propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, bis(4-(diglycidylamino)-phenyl)methane, or p-(diglycidylamino)phenyl glycidyl ether.

17. A process for curing an epoxide resin, comprising
(i) forming a composition as claimed in claim 1 and
(ii) heating the composition until the epoxide resin is cured.

18. A process according to claim 17, in which the composition is heated at from 100° to 180° C.

19. A process according to claim 17, in which the composition is heated for from 30 to 120 minutes.

20. A cured product obtained by a process as claimed in claim 17.

* * * * *